(12) United States Patent
Zhou

(10) Patent No.: US 9,534,263 B2
(45) Date of Patent: Jan. 3, 2017

(54) METHOD FOR PREPARING LEATHER FOR CASES

(71) Applicant: Shizhi Zhou, Guangdong (CN)

(72) Inventor: Shizhi Zhou, Guangdong (CN)

(*) Notice: Subject to any disclaimer, the term of this patent is extended or adjusted under 35 U.S.C. 154(b) by 0 days.

(21) Appl. No.: 14/751,143

(22) Filed: Jun. 26, 2015

(65) Prior Publication Data

US 2016/0186274 A1   Jun. 30, 2016

(30) Foreign Application Priority Data

Dec. 25, 2014 (CN) .......................... 2014 1 0819241

(51) Int. Cl.
*C14B 5/02* (2006.01)
*C14B 5/00* (2006.01)
*B29C 45/14* (2006.01)
*B29K 711/08* (2006.01)

(52) U.S. Cl.
CPC .............. *C14B 5/02* (2013.01); *B29C 45/1418* (2013.01); *C14B 5/00* (2013.01); *B29C 45/14778* (2013.01); *B29K 2711/08* (2013.01)

(58) Field of Classification Search
CPC ................ C14B 1/00; C14B 1/02; C14B 1/30; C14B 1/56; C14B 5/02; C14B 7/02; B29C 45/0053
See application file for complete search history.

(56) References Cited

U.S. PATENT DOCUMENTS

| | | | | |
|---|---|---|---|---|
| 4,581,261 A * | 4/1986 | Schaefer | ............. | B29C 37/0082 428/15 |
| 4,923,732 A * | 5/1990 | Schaefer | ................. | B05D 7/12 428/151 |
| 6,177,198 B1 * | 1/2001 | Schaefer | ................. | B32B 27/40 428/212 |
| 6,746,774 B1 * | 6/2004 | Schaefer | ................. | B32B 5/18 428/151 |
| 2008/0241477 A1 * | 10/2008 | Edgar | ..................... | B44B 5/026 428/156 |
| 2009/0162660 A1 * | 6/2009 | Wu | ..................... | B29C 45/0053 428/411.1 |
| 2010/0260965 A1 * | 10/2010 | Wu | ..................... | B29C 45/0053 428/83 |

* cited by examiner

*Primary Examiner* — Shaun R Hurley

(57) ABSTRACT

The invention discloses a method for preparing leather for cases, which comprises: a. selecting cow leather, which comprises dermis layer and subcutaneous tissue layer; b. uniformly cutting the subcutaneous tissue layer as an lamellar layer, and holding it in the inner side of the cow leather; c. sculpturing the cut lamellar subcutaneous tissue layer as a desired embossed pattern, and removing its peripheral portion; d. placing the cow leather sculptured with embossed pattern in a three-dimensional mold, and pressing the embossed pattern portion towards the inner side of the dermis layer so that the raised pattern structure same with the embossed pattern is formed on the outer surface of the dermis layer; e. performing antiseptic treatment; f. performing rubber injection treatment; g. inlaying metal trim parts. With the above processing, the present invention can produce leather for cases with aesthetic style, good visual effect and noticeable feeling of touch.

3 Claims, 1 Drawing Sheet

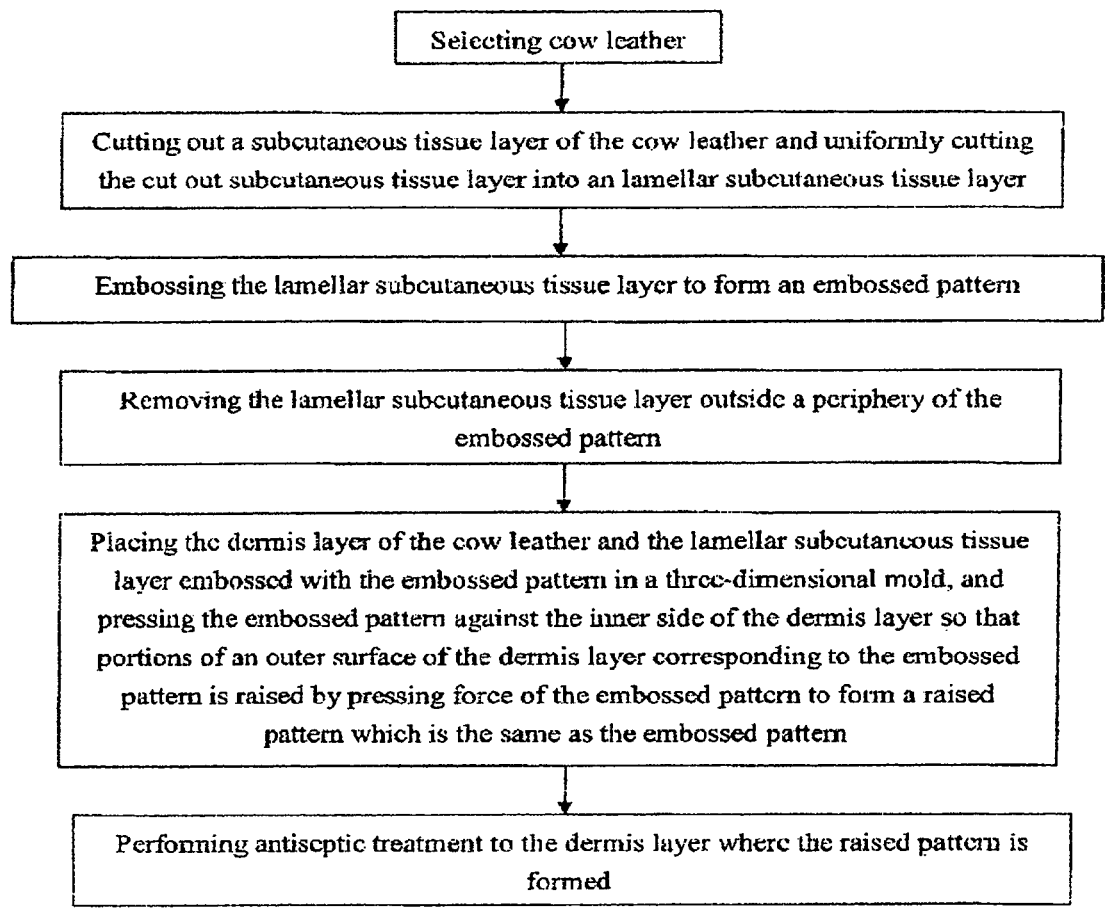

METHOD FOR PREPARING LEATHER FOR CASES

BACKGROUND OF THE INVENTION

The invention relates to the technical field of leather processing, in particular to a method for preparing leather for cases.

As daily necessities for carrying items, cases are widely used in daily life, and especially for women, they have not been only limited to functions for carrying items, but increasingly play a role in dressing functions.

For high quality cases, cow leather is the main material used. Along with the increasing requirements for cases, dramatic changes in the styles of leather for cases have been involved and traditional single genuine leather cases are gradually unable to meet the requirements of consumers.

Printing, spraying and other ways are mainly used for forming embossed pattern on leather surface in conventional methods, this embossed pattern formed in these manners are not really formed in the genuine leather, and the pattern is unrealistic, easy to fall off and unaesthetic.

BRIEF SUMMARY OF THE INVENTION

The invention is directed to provide a method for preparing leather for cases, with which, leather for cases with aesthetic style, good visual effect of the embossed pattern and noticeable feeling of touch can be produced.

To realize the above objects, the invention is achieved by the following technical scheme.

A method for preparing leather for cases is provided, comprises the following processing steps:

a. selecting cow leather, which comprises dermis layer and subcutaneous tissue layer located in the inner side of the dermis layer;

b. uniformly cutting the subcutaneous tissue layer of the cow leather as an lamellar subcutaneous tissue layer, and holding the cut lamellar subcutaneous tissue layer in the inner side of the dermis layer after the subcutaneous tissue layer of the cow leather is completely cut;

c. sculpturing the cut lamellar subcutaneous tissue layer as a desired embossed pattern, and removing the subcutaneous tissue layer at periphery of the embossed pattern;

d. placing the cow leather sculptured with embossed pattern in a three-dimensional mold, and pressing the embossed pattern portion at the inner side of the dermis layer so that the raised pattern structure same with the embossed pattern is formed on the outer surface of the dermis layer of the cow leather;

e. performing antiseptic treatment on the cow leather formed with raised pattern structure in the dermis layer;

f. performing rubber injection treatment on the subcutaneous tissue layer of the cow leather after the antiseptic treatment;

g. inlaying metal trim parts on the outer surface of the dermis layer of the cow leather after the rubber injection treatment.

Wherein, antiseptic adopted in the step e consists of the following parts of materials by weight:
sodium chloride 75 parts-80 parts
potassium sulfite 5 parts-10 parts
sodium carbonate 5 parts-10 parts
sodium fluosilicate 2 parts-3 parts
aluminium phosphide 1 parts-3 parts
10,10-oxybisphenoxarsine 0.5 parts-2 parts Further, antiseptic adopted in the step e consists of the following parts of materials by weight:
sodium chloride 80 parts
potassium sulfite 6 parts
sodium carbonate 7 parts
sodium fluosilicate 3 parts
aluminium phosphide 2 parts
10,10-oxybisphenoxarsine 2 parts The beneficial effects of the invention are described as follows: a method for preparing leather for cases including: a. selecting cow leather, which comprises dermis layer and subcutaneous tissue layer located in the inner side of the dermis layer; b. uniformly cutting the subcutaneous tissue layer of the cow leather as an lamellar subcutaneous tissue layer, and holding the cut lamellar subcutaneous tissue layer in the inner side of the dermis layer after the subcutaneous tissue layer of the cow leather is completely cut; c. sculpturing the cut lamellar subcutaneous tissue layer as a desired embossed pattern, and removing the subcutaneous tissue layer at periphery of the embossed pattern; d. placing the cow leather sculptured with embossed pattern in a three-dimensional mold, and pressing the embossed pattern portion towards the inner side of the dermis layer so that the raised pattern structure same with the embossed pattern is formed on the outer surface of the dermis layer of the cow leather; e. performing antiseptic treatment on the cow leather formed with raised pattern structure in the dermis layer; f. performing rubber injection treatment on the subcutaneous tissue layer of the cow leather after the antiseptic treatment; g. inlaying metal trim parts on the outer surface of the dermis layer of the cow leather after the rubber injection treatment. With the above processing steps, the present method for preparing leather for cases can produce leather for cases with aesthetic style, good visual effect and noticeable feeling of touch; and compared with the existing embossed pattern formed by spraying on the leather surface, the effects and durability of the present embossed pattern are superior to prior art.

BRIEF DESCRIPTION OF THE DRAWINGS

FIG. 1 is a flow chart illustrating a method for preparing leather for cases according to the present invention.

DETAILED DESCRIPTION OF THE INVENTION

The invention is now described with reference to the detailed embodiments.

Embodiment 1, method for preparing leather for cases, comprises the processing steps as follows:

a. selecting cow leather, which comprises dermis layer and subcutaneous tissue layer located in the inner side of the dermis layer;

b. uniformly cutting the subcutaneous tissue layer of the cow leather as an lamellar subcutaneous tissue layer, and holding the cut lamellar subcutaneous tissue layer in the inner side of the dermis layer after the subcutaneous tissue layer of the cow leather is completely cut;

c. sculpturing the cut lamellar subcutaneous tissue layer as a desired embossed pattern, and removing the subcutaneous tissue layer at outer side of the edge of the embossed pattern;

d. placing the cow leather sculptured with embossed pattern in a three-dimensional mold, and pressing the embossed pattern portion at the inner side of the dermis layer so that the raised pattern structure same with the embossed pattern is formed on the outer surface of the dermis layer of the cow leather;

e. performing antiseptic treatment on the cow leather formed with raised pattern structure in the dermis layer;

f. performing rubber injection treatment on the subcutaneous tissue layer of the cow leather after the antiseptic treatment, wherein the injection of rubber material in the shrivelled subcutaneous tissue layer after the antiseptic treatment can effectively enhance the overall elasticity;

g. inlaying metal trim parts on the outer surface of the dermis layer of the cow leather after the rubber injection treatment.

With the above processing steps, the method for preparing leather for cases in the embodiment 1 can produce leather for cases with aesthetic style, good visual effect and noticeable feeling of touch.

Embodiment 2, antiseptic adopted in the step e consists of the following parts of materials by weight:

sodium chloride 80 parts
potassium sulfite 6 parts
sodium carbonate 7 parts
sodium fluosilicate 3 parts
aluminium phosphide 2 parts
10,10-oxybisphenoxarsine 2 parts It should be further noted that the antiseptic treatment on the cow leather can be effectively performed by the antiseptic in embodiment 2 and the antiseptic effect is good with the above material ratio. Embodiment 3, antiseptic adopted in the step e consists of the following parts of materials by weight:

sodium chloride 75 parts
potassium sulfite 10 parts
sodium carbonate 8 parts
sodium fluosilicate 3 parts
aluminium phosphide 2 parts
10,10-oxybisphenoxarsine 2 parts It should be further noted that the antiseptic treatment on the cow leather can be effectively performed by the antiseptic in embodiment 3 and the antiseptic effect is good with the above material ratio.

Embodiment 4, antiseptic adopted in the step e consists of the following parts of materials by weight:

sodium chloride 78 parts
potassium sulfite 8 parts
sodium carbonate 8 parts
sodium fluosilicate 2 parts
aluminium phosphide 2 parts
10,10-oxybisphenoxarsine 2 parts It should be further noted that the antiseptic treatment on the cow leather can be effectively performed by the antiseptic in embodiment 4 and the antiseptic effect is good with the above material ratio.

The foregoing is only preferred embodiments of the invention, various changes in particular embodiments and application areas can be made by those skilled in the art according to the principles of the invention, the disclosure should not be understood as limitation to the invention.

What is claimed is:

1. A method for preparing leather for cases, comprising the following processing steps:

selecting cow leather, which comprises a dermis layer and a subcutaneous tissue layer located in an inner side of the dermis layer;

cutting out the subcutaneous tissue layer of the cow leather and uniformly cutting the cut out subcutaneous tissue layer into an lamellar subcutaneous tissue layer;

embossing the lamellar subcutaneous tissue layer to form a desired embossed pattern, and removing the lamellar subcutaneous tissue layer outside a periphery of the embossed pattern;

placing the dermis layer of the cow leather and the lamellar subcutaneous tissue layer embossed with the embossed pattern in a three-dimensional mold, and pressing the embossed pattern of the lamellar subcutaneous tissue layer against the inner side of the dermis layer so that portions of an outer surface of the dermis layer corresponding to the embossed pattern is raised by pressing force of the embossed pattern to form a raised pattern which is the same as the embossed pattern; and performing antiseptic treatment to the dermis layer where the raised pattern is formed.

2. A method for preparing leather for cases according to claim 1, wherein antiseptic used in the antiseptic treatment is prepared by mixing the following parts of materials by weight:

sodium chloride 75 parts-80 parts;
potassium sulfite 5 parts-10 parts;
sodium carbonate 5 parts-10 parts;
sodium fluosilicate 2 parts-3 parts;
aluminum phosphide 1 parts-3 parts;
10,10-oxybisphenoxarsine 0.5 parts-2 parts.

3. A method for preparing leather for cases according to claim 2, wherein there are 80 parts of said sodium chloride, 6 parts of said potassium sulfite, 7 parts of said sodium carbonate, 3 parts of said sodium fluosilicate, 2 parts of said aluminum phosphide and 2 parts of said 10,10-oxybisphenoxarsine.

* * * * *